(12) United States Patent
Burgdorf et al.

(10) Patent No.: US 10,254,130 B2
(45) Date of Patent: Apr. 9, 2019

(54) SENSOR ARRANGEMENT AND MAGNETIZATION DEVICE, AND USE OF THE SENSOR ARRANGEMENT IN A MOTOR VEHICLE CONTROL DEVICE

(71) Applicant: CONTINENTAL TEVES AG & CO. OHG, Frankfurt (DE)

(72) Inventors: Christian Burgdorf, Offenbach (DE); Zlatko Penzar, Frankfurt am Main (DE); Volker Schardt, Frickhofen (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 29 days.

(21) Appl. No.: 15/033,215

(22) PCT Filed: Sep. 24, 2014

(86) PCT No.: PCT/EP2014/070370
§ 371 (c)(1),
(2) Date: Apr. 29, 2016

(87) PCT Pub. No.: WO2015/078607
PCT Pub. Date: Jun. 4, 2015

(65) Prior Publication Data
US 2016/0265940 A1 Sep. 15, 2016

(30) Foreign Application Priority Data

Nov. 26, 2013 (DE) .......................... 10 2013 224 135
Jan. 10, 2014 (DE) .......................... 10 2014 200 365

(51) Int. Cl.
*G01B 7/30* (2006.01)
*G01D 5/16* (2006.01)
(Continued)

(52) U.S. Cl.
CPC ................ *G01D 5/16* (2013.01); *B60T 8/171* (2013.01); *G01D 5/145* (2013.01); *H01F 7/064* (2013.01);
(Continued)

(58) Field of Classification Search
CPC .......... G01D 5/145; G01D 5/147; G01D 5/12; G01D 5/14; G01D 5/16; G01D 5/2457;
(Continued)

(56) References Cited

U.S. PATENT DOCUMENTS 3,663,843 A * 5/1972 Smith ................... G01D 5/145
257/E43.002
6,867,582 B2 * 3/2005 Muraji .................. G01D 5/145
324/207.2
(Continued)

FOREIGN PATENT DOCUMENTS

CN 101180519 B 10/2010
DE 10133542 2/2002
(Continued)

OTHER PUBLICATIONS

Chinese Office Action for Chinese Application No. 2014800642675, dated Mar. 20, 2017, including English translation, 13 pages.
(Continued)

*Primary Examiner* — Thang X Le
(74) *Attorney, Agent, or Firm* — RatnerPrestia

(57) ABSTRACT

A sensor arrangement for measuring a rotor position of an electric motor, in particular of a motor vehicle control device, wherein the sensor arrangement is constructed as a sensor arrangement operating without contact, which includes at least one permanent magnet and at least one magnetic field sensor, wherein the permanent magnet has at least one depression in at least one top surface facing the magnetic field sensor. A magnetization device for magne-
(Continued)

tizing a permanent magnet of the sensor arrangement is also disclosed. The use of the sensor arrangement in a motor vehicle control device of a braking system of a motor vehicle is also disclosed.

11 Claims, 10 Drawing Sheets

(51) Int. Cl.
 *G01D 5/14* (2006.01)
 *H01F 13/00* (2006.01)
 *H02K 11/215* (2016.01)
 *B60T 8/171* (2006.01)
 *H01F 7/06* (2006.01)

(52) U.S. Cl.
 CPC ........... *H01F 13/00* (2013.01); *H01F 13/003* (2013.01); *H02K 11/215* (2016.01)

(58) Field of Classification Search
 CPC .... G01D 5/2013; G01D 5/2046; G01P 1/026; G01P 3/66; G01P 3/68; G01P 3/665; G01P 3/443; G01P 3/488; G01P 3/487; G01P 3/481; G01P 3/685; G01B 7/30; G01B 7/003; G01B 7/14
 USPC ................ 324/173–174, 178–179, 161, 162, 324/207.11–207.26, 259
 See application file for complete search history.

(56) References Cited

U.S. PATENT DOCUMENTS

| | | |
|---|---|---|
| 7,112,962 B2 | 9/2006 | Ricks |
| 7,489,127 B2 | 2/2009 | Bauer |
| 9,003,903 B2 | 4/2015 | Drumm |
| 9,116,018 B2* | 8/2015 | Frachon ................. G01D 5/147 |
| 2002/0011837 A1 | 1/2002 | Sato |
| 2006/0103373 A1 | 5/2006 | Ricks et al. |
| 2006/0152215 A1* | 7/2006 | Mizutani ................ G01D 5/145 |
| | | 324/207.25 |
| 2007/0075705 A1* | 4/2007 | Kurumado ............. G01D 5/147 |
| | | 324/207.25 |
| 2008/0184843 A1 | 8/2008 | Klotzbuecher |
| 2008/0238415 A1* | 10/2008 | Bauer .................... G01D 5/145 |
| | | 324/207.25 |
| 2011/0227568 A1* | 9/2011 | Dordet ................... G01D 5/145 |
| | | 324/251 |
| 2013/0063133 A1* | 3/2013 | Iwata .................... G01D 5/145 |
| | | 324/207.2 |
| 2013/0241539 A1* | 9/2013 | Wolschlager ............ G01D 1/00 |
| | | 324/207.25 |
| 2016/0169984 A1* | 6/2016 | Werth .................. G01R 33/091 |
| | | 324/244 |

FOREIGN PATENT DOCUMENTS

| | | |
|---|---|---|
| DE | 102005011090 | 9/2006 |
| DE | 102005013442 | 9/2006 |
| DE | 102007016133 | 10/2008 |
| DE | 102008040360 | 1/2010 |
| DE | 102010039916 | 3/2011 |
| EP | 1975569 | 10/2008 |

OTHER PUBLICATIONS

German Search Report for German Application No. 10 2014 200 365.2 dated Nov. 13, 2015, including partial translation.
International Search Report and Written Opinion of the International Searching Authority for International Application No. PCT/EP2014/070370 dated Jul. 7, 2015.

\* cited by examiner a)

b)

a) b)

c)

a)

b)

SENSOR ARRANGEMENT AND MAGNETIZATION DEVICE, AND USE OF THE SENSOR ARRANGEMENT IN A MOTOR VEHICLE CONTROL DEVICE

CROSS REFERENCE TO RELATED APPLICATIONS

This application is the U.S. National Phase Application of PCT International Application No. PCT/EP2014/070370, filed Sep. 24, 2014, which claims priority to German Patent Application No. 10 2013 224 135.6, filed Nov. 26, 2013 and German Patent Application No. 10 2014 200 365.2, filed Jan. 10, 2014, the contents of such applications being incorporated by reference herein.

FIELD OF THE INVENTION

The present invention relates to a sensor arrangement for a motor vehicle control device, to a magnetization apparatus for magnetizing a permanent magnet of the sensor arrangement, and to the use of the sensor arrangement in a motor vehicle control device.

BACKGROUND OF THE INVENTION

DE 10 2010 039 916 A1, which is incorporated by reference, describes a linear unit having a sensor device for capturing a rotor position of an electric motor, wherein the sensor device is configured as a contactlessly operating sensor arrangement which consists of a position encoder arranged on the longitudinal axis of the linear unit and of a non-movable position sensor element. In a known manner, the position encoder used is a magnet, and the position sensor element used is a magnetic field sensor.

The accuracy when positioning or commutating the rotor is limited by an occurring magnetic angular error at the magnetic field sensor, with respect to a preferred magnetic field direction. For modern motor vehicle systems, it is necessary, owing to increasing safety and comfort requirements with at the same time lower available space requirements, to exploit the potential efficiency of the electric motor, such as the maximally generated torque thereof, in an, improved manner. In addition, it is possible for further, possibly adjoining sensors, for example of a motor vehicle braking system, to be influenced significantly by occurring magnetic stray fields. As a result, safety-critical situations can be brought about and/or the comfort of vehicle occupants can be negatively affected. Known measures for dampening these stray fields with respect to further functional assemblies in the immediate vicinity are in particular ferromagnetic shielding plates which are located annularly around the magnets. When using a shielding plate, the magnet must under certain circumstances be dimensioned such that it is greater and/or thicker for properties of the sensor arrangement that stay the same. The shielding of magnetic stray fields thus leads to an increased space requirement and additional manufacturing costs.

SUMMARY OF THE INVENTION

An aspect of the invention provides a sensor arrangement with which a reduction in the magnetic angular error in particular in the region of the magnetic field sensor is attained. Another aspect is further functional assemblies of a motor vehicle control device comprising the sensor arrangement to be influenced less by magnetic stray fields thereof. Further application-specific conditions, such as for example a minimum field strength at a sensor, must also be fulfilled.

An aspect of the invention describes a sensor arrangement for detecting a rotor position of an electric motor in particular of a motor vehicle control device, wherein the sensor arrangement is configured as a contactlessly operating sensor arrangement which comprises at least one permanent magnet and at least one magnetic field sensor, wherein the permanent magnet has at least one depression in at least one top surface facing the magnetic field sensor. A depression is understood to mean, in particular, a cutout, such as for example a groove or a joint gap and/or a through-hole.

Advantageously, a substantially more homogeneous magnetic field line profile having, with respect to the magnetic field sensor, small angular errors is thus present in particular in the region of the magnetic field sensor, wherein required minimum field strengths continue to be achieved and magnetic stray fields can be reduced. An angular error is understood to mean a deviation from the preferred field direction in the plane of the magnetic field sensor. For example, if the plane of the magnetic field sensor is the xy plane and the direction that is preferred the y-direction, it is possible for the angular error to be determined from the arc tangent of the relationship of the x-component to the y-component of the magnetic field.

Within the context of the invention, however, such shielding can likewise be provided, as a result of which likely deviating measurements, from those mentioned in this application by way of example, can result owing to its interaction with the sensor arrangement. Eddy currents, which can bring about further magnetic fields and thus likewise disturb the further functional assemblies, are induced in a shielding which is fixed with respect to the permanent magnet. No eddy currents are induced in shieldings that rotate together with the permanent magnet, which is why this embodiment would be preferred. However, with a high measurement accuracy remaining the same over the lifetime and external conditions, the additional mass moment of inertia brought about by the shielding must be able to be absorbed.

According to a preferred embodiment, the depression on the top surface of the permanent magnet has a rectangular or oval shape. Oval shapes here comprise for example circular and elliptic geometries. In an advantageous manner, the angular error of the magnetic field can be influenced and optimized with respect to the respective marginal conditions of the motor vehicle control device by matching the dimensions of the permanent magnet, in particular of the depression.

A longer axis of the depression preferably extends along at least a first pole boundary of the magnetization of the permanent magnet. The depression runs, in a particularly preferred manner completely, through the top surface of the permanent magnet along the longer axis.

The permanent magnet has, parallel to the longer axis of the depression and/or the first pole boundary of the magnetization of the permanent magnet, side surfaces which are oriented such that they are straight and in particular parallel, or which describe a curved profile. These are preferably mirror-symmetrical with respect to the longer axis. Further side surfaces of the permanent magnet which are not oriented along the longer axis of the depression and/or of the first pole boundary have a curved or straight profile. Curved profiles are, for example, hyperbolic, circular arc shaped or elliptical curves. Alternatively, these further side surfaces of the permanent magnet can preferably also be configured such that they are straight and in particular parallel with respect to one another.

According to a particularly preferred embodiment of the sensor arrangement, the permanent magnet is magnetized as a magnetic dipole or as a magnetic quadrupole. In particular in the case of a magnetic quadrupole, magnetic stray fields can advantageously be significantly reduced, as a result of which in particular possible further adjacent functional assemblies, e.g. sensors, of the control device comprising the sensor arrangement are influenced to a lesser extent. Additional shielding of the magnetic field can furthermore be dispensed with, which is advantageous not just in the sense of the reduction of error sources of the sensor arrangement and the overall system, but also in the sense of reduced manufacturing costs and space requirement. The permanent magnet is preferably composed of a plastics-bonded neodymium iron boron (NdFeB) material.

With particular preference, the magnetic field sensor is spaced apart from the top surface of the permanent magnet such that said sensor is arranged within a region of a minimum of an angular error of the magnetic field of the permanent magnet. The distance between the magnet and the sensor can be advantageously reduced significantly as compared to the prior art, as a result of which in particular the space requirement is reduced. The location of the minimum of the magnetic angular error, for example with respect to the distance from the top surface of the magnet, is preferably adapted in an application-specific manner by a corresponding design of the sensor apparatus or by the features thereof and/or of the permanent magnet described in this application, wherein the magnet can also be located in the direct vicinity of the magnetic field sensor.

The permanent magnet is preferably fixed to a shaft, wherein the material of the permanent magnet is injection-molded around and/or to the shaft in particular in an injection-molding method. The manufacture and fixing of a base body, which is preferably magnetized in a subsequent process step to form the permanent magnet, are thus advantageously carried out in one process step. The result of this measure, in particular as compared to further mounting methods known per se, such as for example adhesively bonding the permanent magnet to the shaft, is not just the saving of manufacturing costs, but also the observation of necessary tolerances of modern motor vehicle systems, such as for example a low imbalance of the shaft. Within the context of the invention, however, other joining methods are also provided, in particular those which are known per se, for mechanically connecting the base body of the permanent magnet or the already magnetized permanent magnet to the shaft. This includes for example adhesively bonding or pressing the shaft into an opening of the magnetized or not yet magnetized permanent magnet that is intended therefor.

Furthermore, a reduction in the dimensions of the permanent magnet or in the volume of the magnet material is attained advantageously by way of the invention, as a result of which the magnetic stray field of the permanent magnet can likewise be limited, the space requirement of the permanent magnet can be reduced, and material costs can be saved.

An aspect of the invention also describes a magnetization apparatus for magnetizing a permanent magnet for the sensor apparatus according to the invention, wherein the magnetization apparatus has at least one unipartite or multipartite yoke and at least two conductors and is configured such that the permanent magnet to be magnetized can be magnetized as a quadrupole. This supports the fulfilment of the requirements that are imposed on the sensor arrangement according to the invention. The magnetization apparatus can furthermore advantageously be integrated comparatively easily into existing production lines.

According to a preferred embodiment, the magnetization apparatus has at least two magnetic circuits having in each case at least one gap and is configured such that the permanent magnet to be magnetized can be introduced at least partially into both magnetic circuits. Magnetic fluxes of the magnetic circuits are preferably guided partially through the unipartite or multipartite yoke which is interrupted by the gaps, wherein the magnetization apparatus is configured such that the magnetic field can penetrate substantially perpendicularly into the surface of the permanent magnet that is brought into the gaps and/or can exit from the surface of the permanent magnet substantially perpendicularly. The magnetization apparatus is furthermore configured such that magnetization of the permanent magnet that is mounted to the shaft is realizable, wherein a roller bearing is additionally mounted in particular to the shaft.

The magnetization apparatus or the process associated therewith for magnetizing the magnet is preferably used during at least one manufacturing process of the magnet and/or of the sensor apparatus, in particular to impress a required magnetization on the magnet.

An aspect of the invention furthermore relates to the use of the sensor arrangement according to the invention in a motor vehicle control device of a braking system, wherein the motor vehicle control device comprises in particular at least one pedal position sensor.

BRIEF DESCRIPTION OF THE DRAWINGS

Further preferred embodiments can be gathered from the following description of exemplary embodiments with reference to figures.

In a principle illustration.

DETAILED DESCRIPTION OF THE PREFERRED EMBODIMENTS

In order to permit a short and simple description of the exemplary embodiments, identical elements are provided with the same reference signs and only the details that are essential to the invention will be explained in each case.

Figure 1:
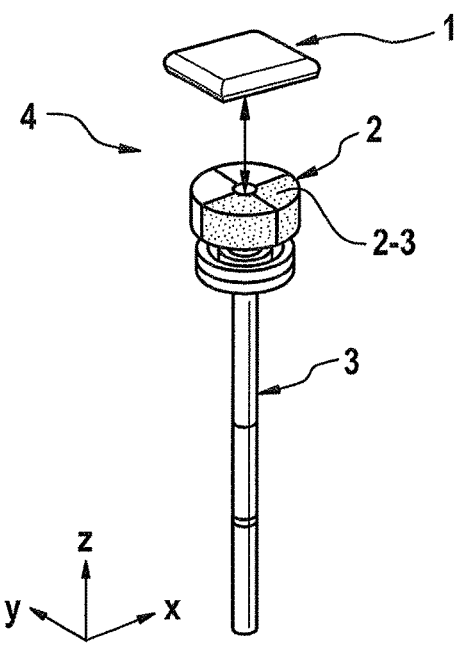
FIG. 1 shows a sensor arrangement according to the prior art.

FIG. 1 shows a sensor arrangement 4, which is known per se, as is used in particular to support the commutation of an electric motor, for example of an electric motor of a linear actuator of a motor vehicle braking system and/or of a steering system of a motor vehicle, and is employed as an angle sensor arrangement or incremental transmitter. Said sensor arrangement 4 comprises at least sensor element 1 and the two-pole permanent magnet 2 that is fixed axially to the shaft 3 and the top surface 2-3 of which is orientated substantially perpendicularly to the z-axis and, according to this exemplary embodiment, parallel to the sensor element 1. The sensor element 1 is, according to an example, an AMR sensor which is arranged at an axial distance from the magnet 2. However, types of magnetic field sensors that deviate therefrom, for example Hall, GMR, XMR, AMR, TMR etc., can also be used to detect magnetic fields—also in the context of the present invention. If the shaft 3 and the magnet 2 are rotated, the orientation and/or field strength of the magnetic field of the magnet 2 is detected using the sensor element 1. The setup of the sensor arrangement 4 substantially also applies as the basis for the following descriptions of the preferred exemplary embodiments according to the invention.

Figure 2:
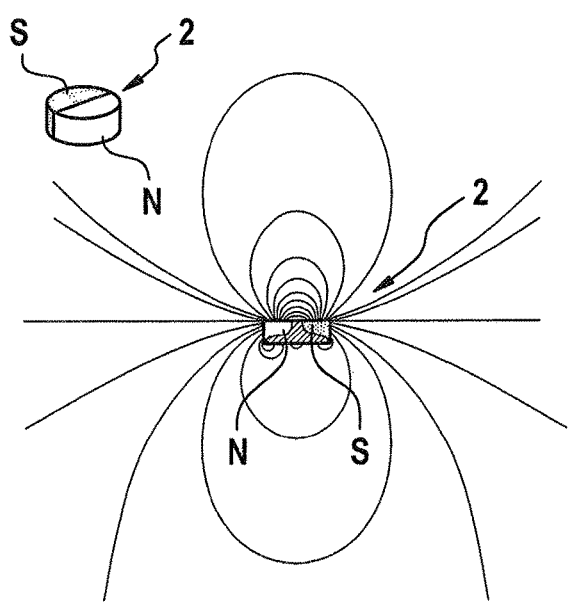
FIGS. 2a) and 2b) show magnetic field line profiles of circular permanent magnets 2 that are configured as dipole and quadrupole.
Figure 2:
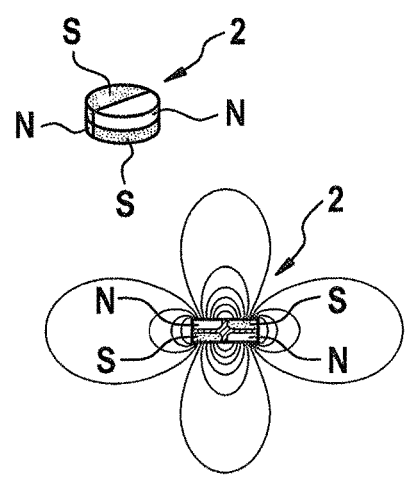

FIGS. 2 a) and b) show by way of example magnetic field line profiles of circular permanent magnets 2 that are configured as a dipole and a quadrupole. The figures show that the permanent magnet that is magnetized as a dipole according to FIG. 2 a) has a more expanded magnetic stray field than the permanent magnet 2 that is polarized as a quadrupole according to FIG. 2 b) and in which the illustrated magnetic, field lines are closed in a comparatively small space around the permanent magnet 2. By way of example, located on a side of the permanent magnet 2, which is configured as a dipole, that faces the shaft 3 (not illustrated) are spacious field line profiles which, during the design of the sensor arrangement 4 according to this embodiment, should be taken into special consideration so as to limit potential disturbances which are caused thereby to the sensor arrangement itself or to further functional assemblies of the motor vehicle control device comprising the sensor arrangement. If the permanent magnet 2 instead has a quadrupole magnetization, these field lines are closed in a comparatively close region around the magnet 2, as a result of which the likelihood of disturbances to further assemblies is lower.

Figure 3:
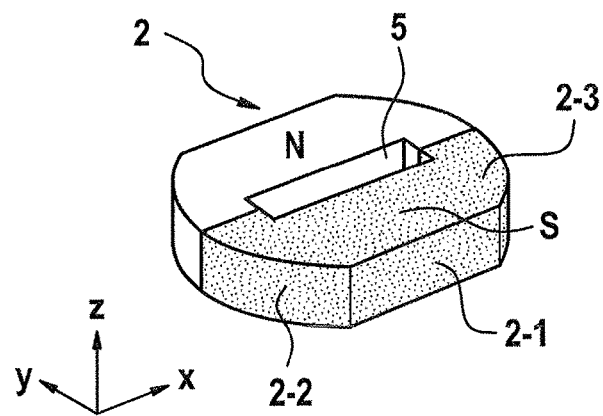
FIG. 3 shows an exemplary embodiment of the permanent magnet 2 according to the invention configured as a dipole.

FIG. 3 illustrates an exemplary embodiment according to the invention of the permanent magnet 2, wherein the latter has a two-pole design and has the rectangular depression 5 along the pole boundary, starting from the top surface 2-3 of the magnet 2. The magnetic field profile and thus in particular the angular error within the region of the magnetic field sensor 1 are acted upon by means of the depression 5 and the parallel side surfaces 2-1. According to the invention, a plurality of depressions 5 can also be present so as to be able to carry out more specific adaptations of the field profile. The permanent magnet 2 has straight side surfaces 2-1 parallel to the first pole boundary of the magnetization of said permanent magnet 2. The other side surfaces 2-2, which are not oriented parallel to the pole boundary, have a circular arc shape.

Figure 4:
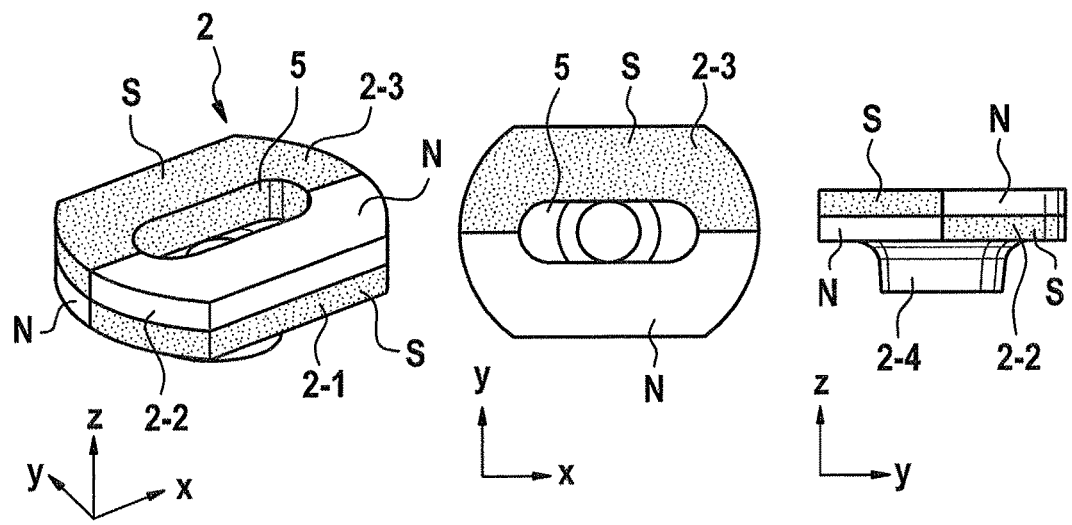
FIG. 4 shows an exemplary embodiment of the permanent magnet 2 according to the invention configured as a quadrupole in different views, FIGS. 5a) and 5b) show a further exemplary embodiment of the permanent magnet 2 according to the invention, FIGS. 6a)-6c) show an exemplary embodiment of the sensor arrangement 4 according to the invention in different views and with a simulated magnetic field line profile.

FIG. 4 shows an exemplary embodiment of the permanent magnet 2 which is configured as a quadrupole in different perspectives, wherein an oval depression 5 is provided. The side surfaces 2-1 are likewise straight, and the side surfaces 2-2 have a circular arc shape. In addition, the shaft connection piece 2-4 is illustrated, which the description of FIGS. 5 and 6 will make reference to.

Figure 5:
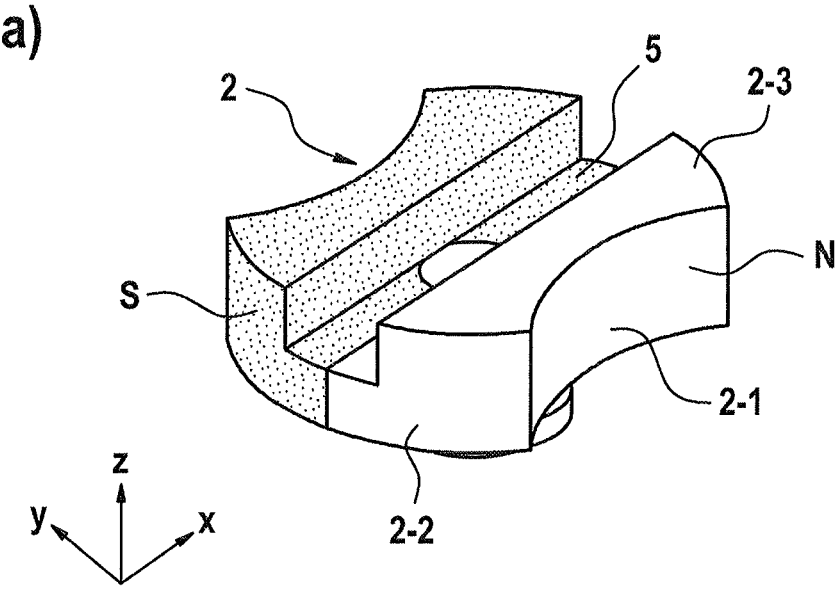
Figure 5:
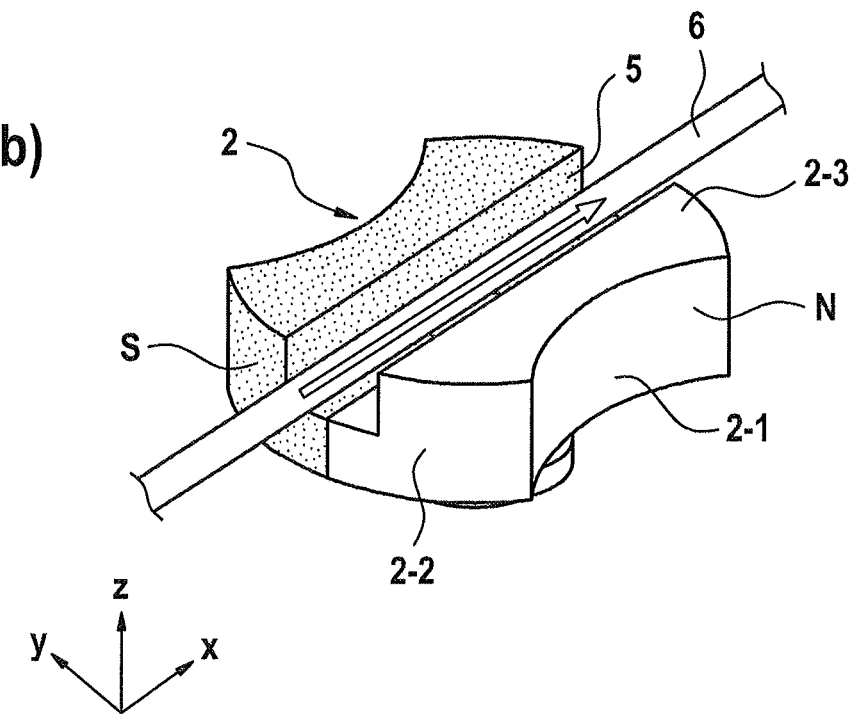

FIG. 5 a) shows a further exemplary embodiment of the permanent magnet 2 in a perspective illustration. By way of example, said permanent magnet 2 is illustrated as a dipole, but can also be configured as a quadrupole within the meaning of the invention. The magnet 2 has, along the pole boundary, starting from the top surface 2-3 of the magnet 2, a continuous depression 5, as compared to the exemplary embodiment of FIG. 3, wherein continuous means that the depression 5 extends from the side surfaces 2-2 of one side to the side surfaces 2-2 of the other side. The side surfaces 2-2 which are not oriented parallel to the pole boundary are circular arc shaped. Another difference with respect to the exemplary embodiment of FIG. 3 is that the side surfaces 2-1 extending in the same orientation as the pole boundary are configured in a circular arc shape such that the magnet 2 has a taper in an imaginary axis which intersects with the existing rotation axis (in the z-direction). According to an aspect of the invention, these shapes are not limited to circular arcs but can also have, by way of example, an oval or hyperbolic geometry. According to this or the further exemplary embodiments according to the invention, the depression 5 can have, in an imaginary y-plane, instead of a rectangular cross-sectional area, cross-sectional areas that deviate therefrom, for example U-shaped. This embodiment has in particular the advantage that it permits, with an angular error that remains the same, a greater radial offset of the sensor element.

FIG. 5 b) illustrates a preferred means or method for producing the two-pole magnetization of the magnet 2 according to the exemplary embodiment of FIG. 5 a), wherein in a particularly simple manner, at least one conductor 6 is introduced into or is arranged in the depression 5, and a current of the desired direction is applied thereto. As a result, the magnet 2 is advantageously surface-magnetized on one side.

Figure 6:
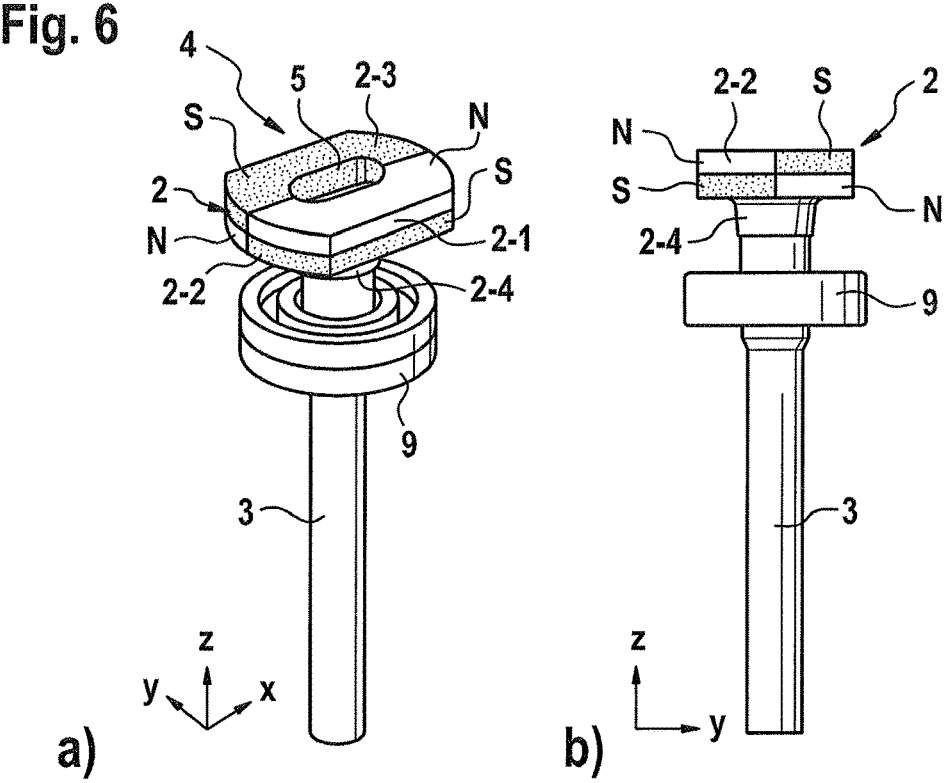
Figure 6:
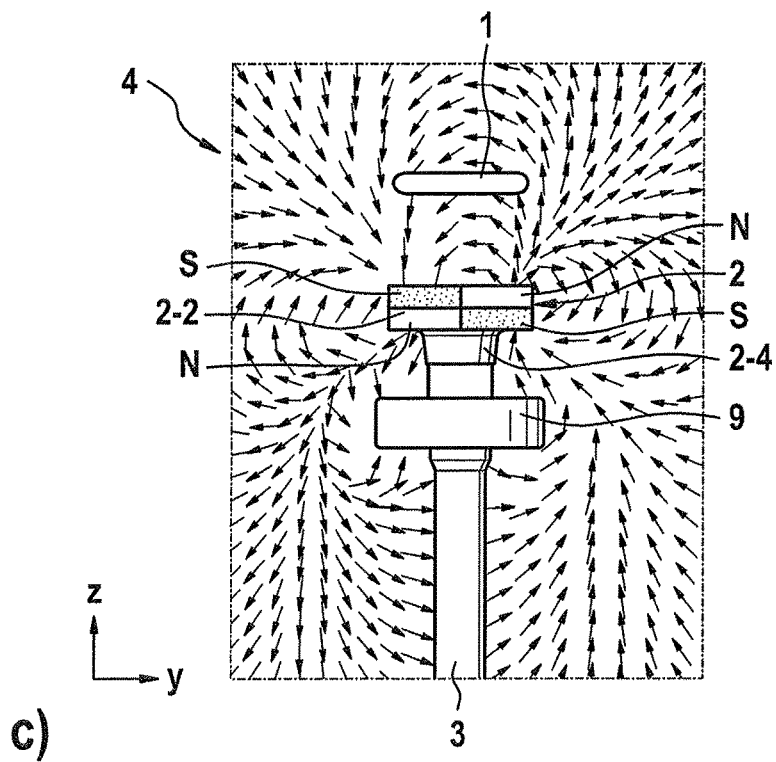
Figure 7:
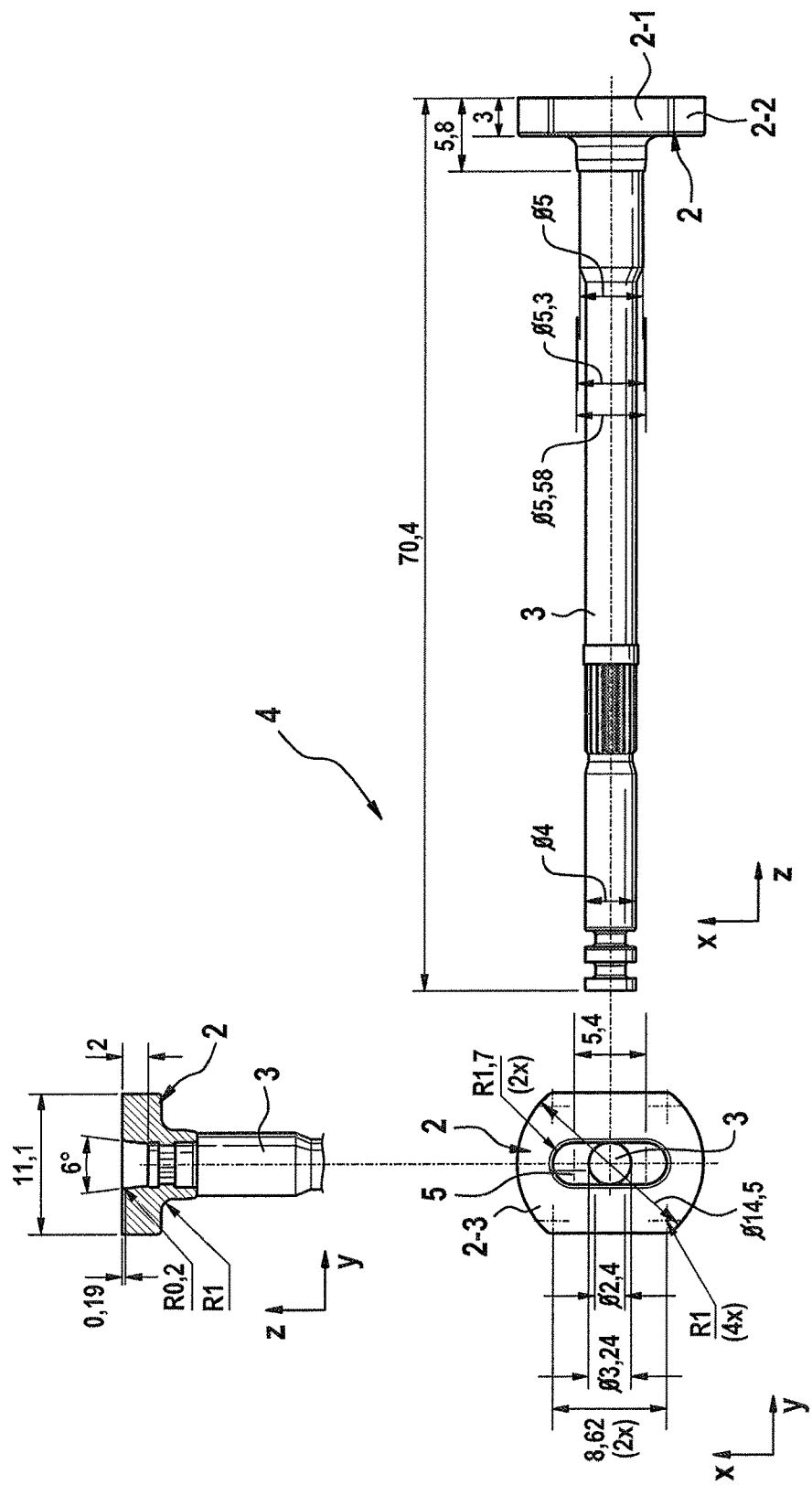
FIG. 7 shows an exemplary embodiment of the sensor arrangement 4 according to the invention (without illustration of sensor 1) in a detail illustration with dimensioning of dimensions according to an example, FIGS. 8a)-8c) show a preferred exemplary embodiment of the magnetization apparatus 8, FIGS. 9a)-9h) show further preferred exemplary embodiments of the magnetization apparatus 8.

FIGS. 6 a) to c) show an exemplary embodiment according to the invention of the sensor arrangement 4, wherein the magnetic field sensor 1 is not illustrated in FIGS. 6 a) and b). Also illustrated is a roller bearing 9, which is manufactured in particular from a ferromagnetic stainless steel, such as for example X14CrMoS17, and which is provided for the rotatably mounted fixing of that side of the shaft 3 that faces the permanent magnet 2. FIG. 7 illustrates the exemplary embodiment according to FIG. 6 in a constructive detail illustration with dimensions according to the example, wherein the roller bearing 9 is not shown. In the installed form, the shaft 3 can be connected directly, for example via a transmission or clutch, to a rotor shaft of an electric motor on that side that is opposite the permanent magnet 2.

The permanent magnet 2 extends beyond the shaft 3 in the z-direction at least by the depth of the depression 5. Alternatively, however, the shaft 3 could also terminate substantially flush with the top surface 2-3. The magnet 2 has, as dimensioned in FIG. 7 and without the shaft connecting piece 2-4, a height in the z-direction of approximately 3 mm and a depth of the depression 5 of 2 mm. As is clear from FIG. 7, the inner walls of the depression 5 are provided, in particular for the simplification of the manufacturing, with an angle with respect to the top surface 2-3 that deviates from 90°. To improve the force transmission to the permanent magnet 2, in particular taking into account existing thermal expansion and vibrations, the conical shaft connecting piece 2-4 is preferably provided. In addition, the shaft 3 can have knurling or comparable means serving this purpose in this attachment region.

In a manufacturing process of the sensor apparatus 4, the material for forming the permanent magnet 2, or the base body thereof which is not yet magnetized due to the magnetization being carried out subsequently, is injection molded, in particular using an injection molding method, around the shaft 3, which is preferably manufactured from a paramagnetic or diamagnetic material, for example X8CrNiS18. Pressing the shaft 3 into the already magnetized or not yet magnetized permanent magnet 2 poses a problem owing to the brittleness of magnet materials in connection with high press-in forces that can damage the magnet material, but is likewise provided within the context of the invention. Alternatively to a paramagnetic or diamagnetic material of the shaft 3, a ferromagnetic material, e.g. X14CrMoS178, can also be provided, whereby for example the magnetic field line profile can be influenced further or other advantages result.

For illustration purposes, FIG. 6 c) shows a field line profile of the sensor arrangement 4, according to the exemplary embodiment of FIGS. 6 a) and b), that is simulated to be substantially as being without interaction. Further assemblies of a motor vehicle control device surrounding the sensor arrangement 4 are not taken into account in the simulation. As already shown in the description regarding FIG. 3, the realized polarization of the magnetization and the geometric specifications of the magnet 2 have a significant influence on the profile of the magnetic field lines and thus on the generated magnetic stray field. According to a further exemplary embodiment (not shown in the figures), provision may therefore be made for the shaft 3 to comprise an end section that is shaped according to the depression 5 for influencing the magnetic field line profile. This end section of the shaft 3 can preferably terminate below the top surface 2-3 or flush therewith or be guided beyond it. Alternatively, the depression 5 can be completely or partially filled by a diamagnetic, paramagnetic or ferromagnetic material. In addition, the remanence of the magnet material or of the materials of the further components, such as for example the shaft or the roller bearing, can be adapted in dependence on the respective requirements of an application.

However, when designing an arrangement having a correspondingly shaped end section of shaft 3—to a particular extent in the case of a rectangular cross-section (hammerhead)—in particular for high speeds of the shaft 3 and the magnet 2 of e.g. 12,000 rpm, as occur in hydraulic pumps for motor vehicle braking systems, the shear forces occurring there should be taken into account so that the magnet 2 is not damaged or split in particular during acceleration and/or deceleration.

Figure 10:
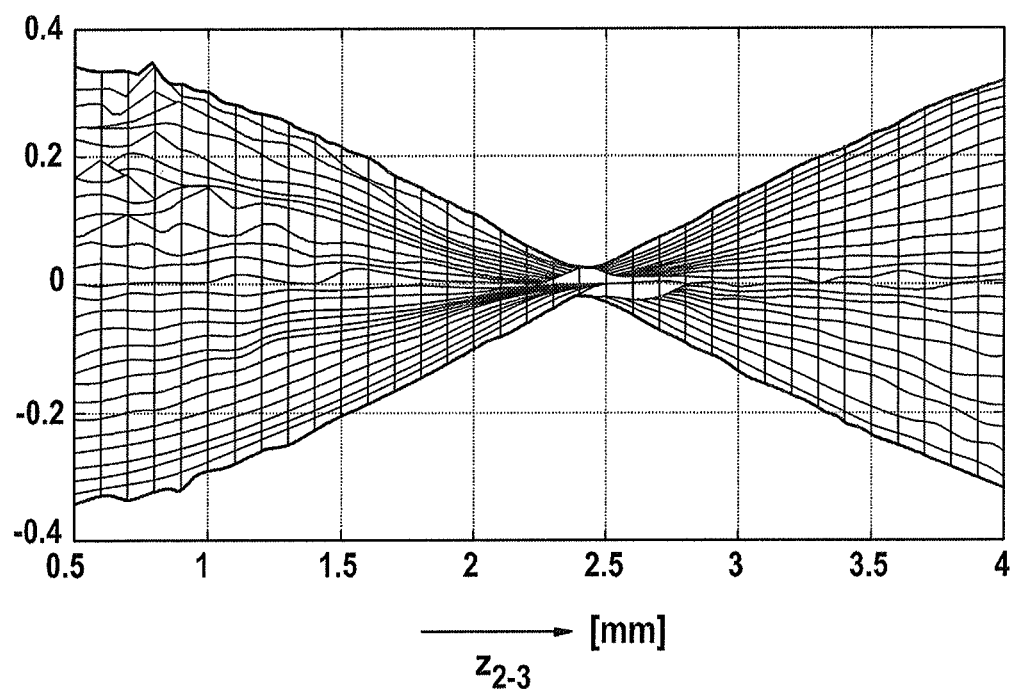
FIG. 10 shows an exemplary illustration of the dependence of the angular error (ordinate) on the distance from the top surface 2-3 (abscissa) of the permanent magnet 2 in a defined axial offset of the sensor element around the rotation axis of the magnet.

FIG. 10 shows the dependence of the angular error (ordinate) on the distance from the top surface 2-3 (abscissa) for an exemplary embodiment of the invention. The angular error here has a minimum at a distance of approximately 2.4 mm, wherein, if further conditions are fulfilled, such as for example a required minimum field strength, the magnetic field sensor 1 is preferably arranged in the region of said minimum. The angular error or the minimum thereof can be adapted, in dependence on the distance from the top surface 2-3 in the direction of the magnetic field sensor 1, to the marginal conditions of the respective application in particular by adapting the width across flats (distance of the side surfaces 2-1 from one another) and the geometry of the side surface 2-1—for example curved or straight profile—and the width (y-direction), length (x-direction) and depth (z-direction) of the depression 5.

Figure 8:
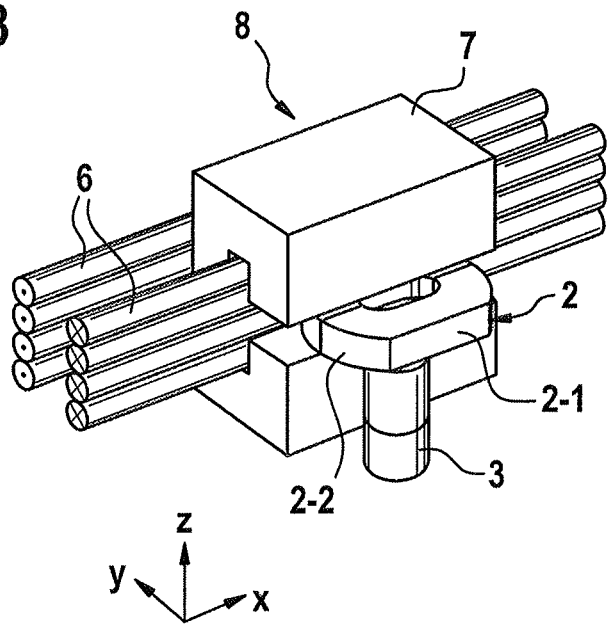
Figure 8:
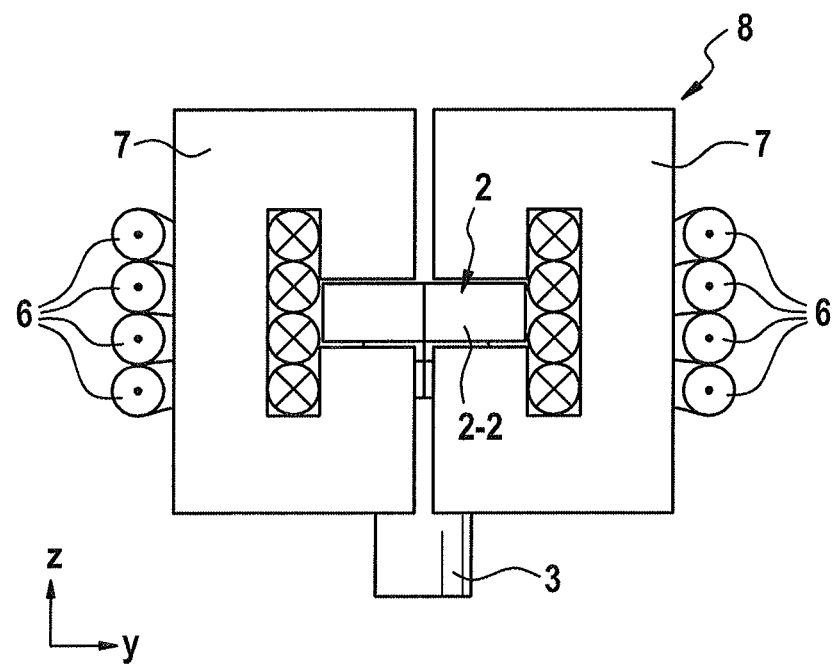
Figure 8C:
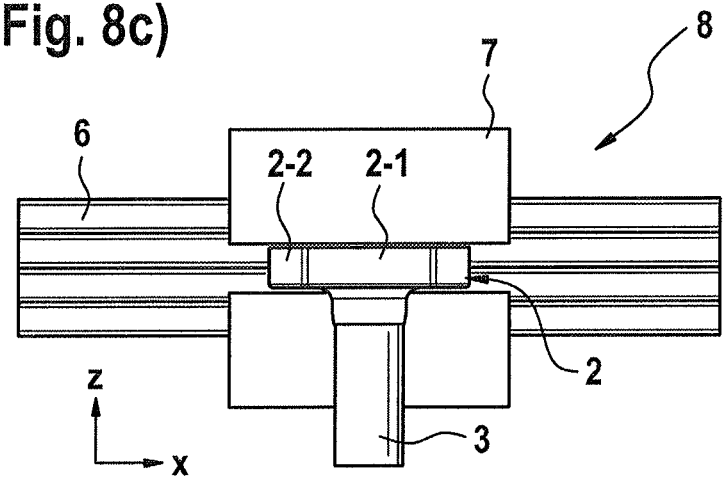

Given below, in the form of key points, are dimensions and tolerance ranges of the sensor arrangement 4 for use in an electro-hydraulic control device of a motor vehicle braking system, which should be considered to be examples and without being limited thereto:

Height of permanent magnet 2 (z-direction) approximately 3 mm field strength in the region of the magnetic field sensor 1 in xy-plane greater than or equal to 42 mT absolute value of the magnetic angular error in the region of the magnetic field sensor 1 smaller than or equal to 0.5° distance of magnet 2 to the magnetic field sensor 1 (nominal air gap) in the z-direction approximately 2 mm minimum distance of magnet 2 to magnetic field sensor 1 (sensitive element) in the z-direction, approximately 0.7 mm axial offset (z-direction) of magnetic field sensor 1 to magnet 2 in the range +/−1.25 mm largest diameter of magnet 2 in xy-plane approximately 14.5 mm depth of depression 5 approximately 2 mm radial offset (x- and/or y-direction) +/−1 mm FIGS. 8 a), b) and c) schematically illustrate in different views an exemplary embodiment of the magnetization apparatus 8 for producing a quadrupole, for example according to FIG. 4 or 5. For better clarity of the perspective illustration, FIG. 8 a) shows only half of the substantially symmetrically set-up magnetization apparatus 8. The latter comprises the conductors 6 and the two-part yoke 7, wherein each part has an air gap of the magnetic circuit, into which the permanent magnet 2 to be magnetized is introduced for carrying out the magnetization. Conductors 6 can preferably also be wound in the form of coils onto the legs of the respective yoke part 7, which gives a transformer-type basic structure. The current directions in the conductors 6 shown are examples and dependent on the polarization of the magnet 2 that is to be achieved, wherein a quadrupole magnet 2 with a polarization according to that shown in FIG. 4 is produced with the current directions according to FIG. 8. The half shown in FIG. 8 a) is shown once again in FIG. 8 c) from the front. By illustrating both halves, the side illustration according to FIG. 8 b) clarifies in particular the mirror-symmetrical setup of the magnetization apparatus 8.

Figure 9A:
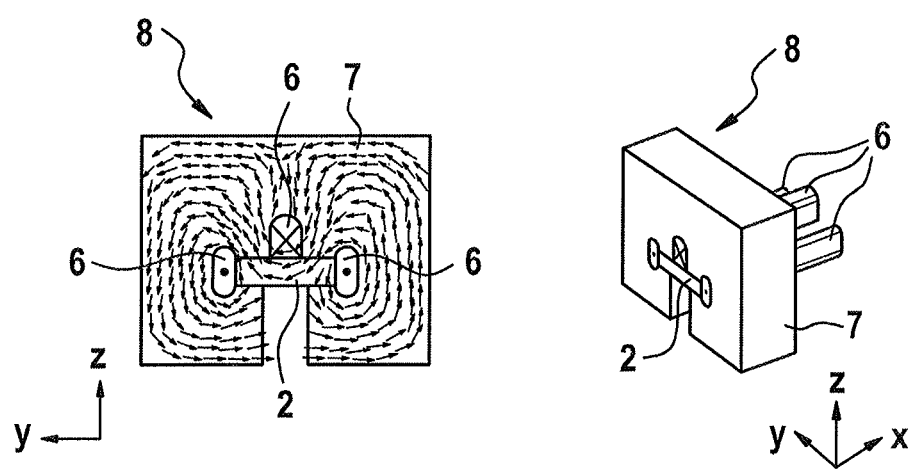
Figure 9:
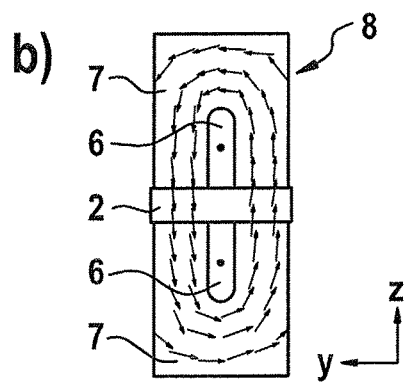
Figure 9:
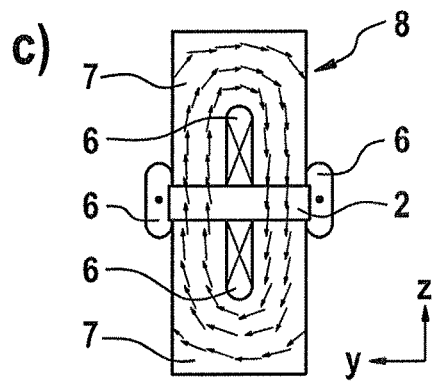
Figure 9:
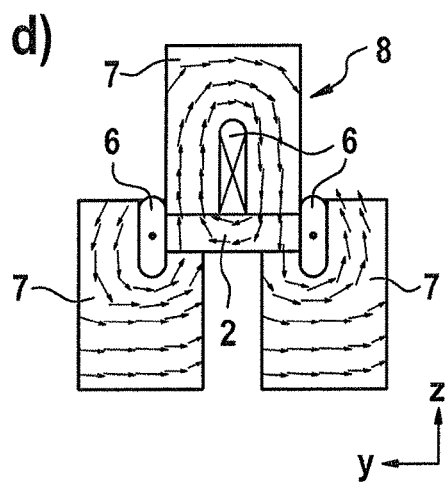
Figure 9:
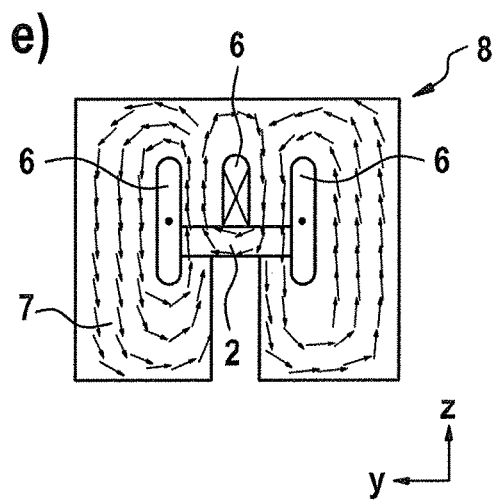
Figure 9:
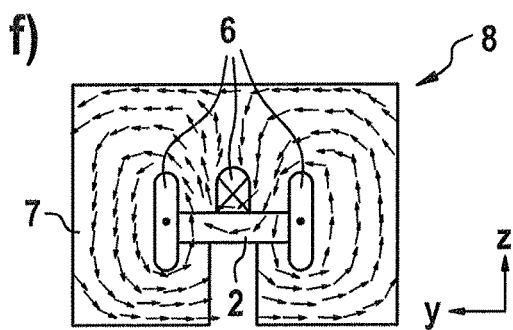
Figure 9:
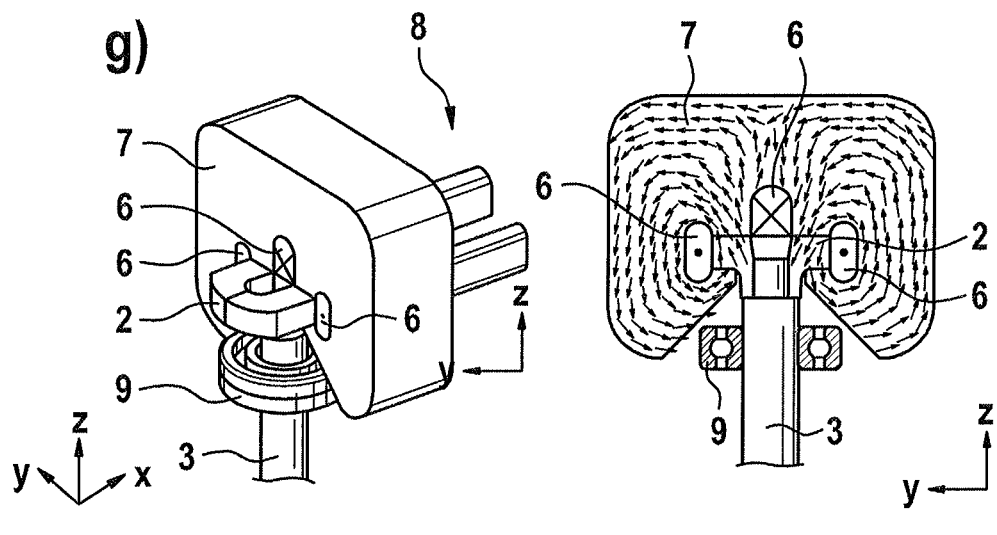
Figure 9:
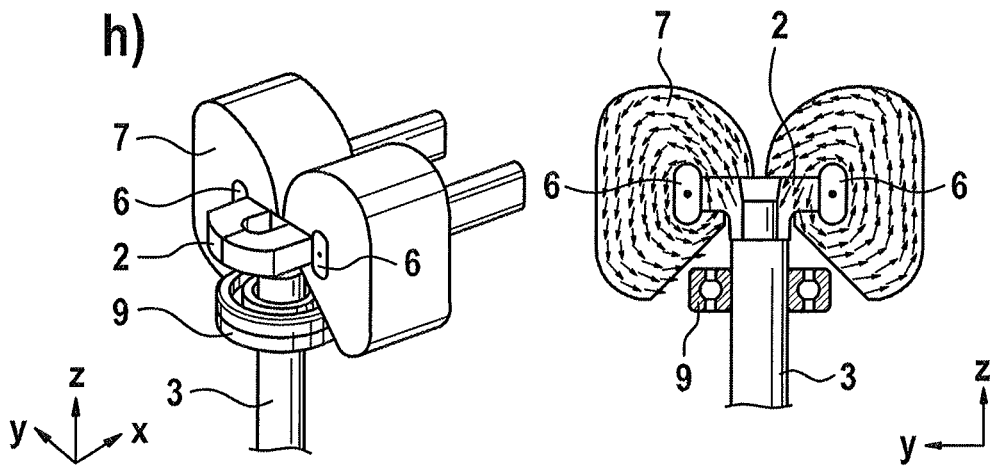

FIGS. 9 a) to h) illustrate further preferred exemplary embodiments of the magnetization apparatus 8 for forming a quadrupole polarization, by means of which the resulting magnetization properties or polarization properties of the permanent magnet 2 in different forms can be specified. By means of a selected specification of the current direction, current strength, for example 40 kA, and pulse duration of the current, for example 200 µs, further possibilities of taking influence on the remaining magnetization properties of the permanent magnet 2 exist. Magnetization of the magnet 2 is provided in particular for the exemplary embodiments of the magnetization apparatus 8 of FIGS. 9 b) and c), without the magnet already being fixed to the shaft 3. In the embodiments according to FIGS. 9 a) and d) to h), the shaft 3 or a tool axis provided for introducing the magnet 2 into the magnetic circuit is taken into account, but not shown in each case or possibly removed in the case of the tool axis during the magnetization process. In supplementation or as an alternative to conductors 6 which are arranged laterally of the permanent magnet 2 or the side surfaces 2-1, further conductors 6 for influencing the impressing magnetic field can be provided, as is shown for example for the embodiments of FIGS. 9 *a*) to *g*). Due to a magnetic field that is caused by a current flow therein, the resulting field lines do not enter for example the top surface 2-3 perpendicularly. The exemplary embodiments of FIGS. 9 *g*) and *h*)—magnetization apparatus 8 is also shown as a section in the perspective illustration—also take into consideration in the forming of yoke 7 the shaft connecting piece 2-4 and the fact that the roller bearing 9 was already attached to the shaft 3. Furthermore, in particular with the embodiment of the magnetization apparatus 8 according to FIG. 9 *g*), it is possible for sufficiently high field strengths for saturation of the magnet material of the permanent magnet 2 with a substantially defined pole boundary along the depression 5 to be achieved. However, an improvement toward an optimum quadrupole polarization of the permanent magnet 2 is realizable by means of the embodiment of the magnetization apparatus 8 according to FIG. 9 *h*). These and other shown features of individual exemplary embodiments of the magnetization apparatus 8 can also be applied within the framework of the invention to further described embodiments. The magnet 2 can, according to the realized implementation of the magnetization apparatus 8 and in particular in dependence on the presence of the shaft 3 or a tool axis, be inserted into and/or removed from the magnetization apparatus 8 for example via an open side (along the conductors 6) and/or, in the case of a multipartite yoke 7, by partial or complete opening thereof.

Fixing of the roller bearing 9 and the permanent magnet 2 to be magnetized to the shaft 3, before the process step of the magnetization is carried out, is preferred in particular from a process-technological point of view and/or for maintaining a prespecified cleanliness class of a motor vehicle system. If the permanent magnet 2 is already magnetized in an earlier process step, it is under certain circumstances possible for metal particles to aggregate thereon in the subsequent work steps. Such contamination can result in malfunctions of and damage to the manufactured product, e.g. motor vehicle control device of a motor vehicle braking system, or the plants for the manufacture thereof.

The invention claimed is:

1. A sensor arrangement for detecting a rotor position of an electric motor of a motor vehicle control device, wherein the sensor arrangement is configured as a contactlessly operating sensor arrangement which comprises at least one permanent magnet and at least one magnetic field sensor, wherein the permanent magnet has at least one depression in at least one top surface facing the magnetic field sensor, wherein the permanent magnet has at least a first pole boundary (N-S) of the magnetization of the permanent magnet, wherein outer side surfaces of the permanent magnet parallel to the first pole boundary have concave profile.

2. The sensor arrangement as claimed in claim 1, wherein the depression on the top surface of the permanent magnet has a rectangular or oval shape.

3. The sensor arrangement as claimed in claim 1, wherein a longer axis of the depression extends along the first pole boundary (N-S) of the magnetization of the permanent magnet.

4. The sensor arrangement as claimed in claim 3, wherein the depression runs completely through the top surface of the permanent magnet along the longer axis.

5. The sensor arrangement as claimed in claim 3, wherein further side surfaces of the permanent magnet which are not oriented along the longer axis of the depression and/or of the first pole boundary (N-S) have a curved or straight profile.

6. The sensor arrangement as claimed in claim 1, wherein the permanent magnet is magnetized as a magnetic dipole or a magnetic quadrupole.

7. The sensor arrangement as claimed in claim 1, wherein the magnetic field sensor is spaced apart from the top surface of the permanent magnet such that said sensor is arranged within a region of a minimum of an angular error of the magnetic field of the permanent magnet.

8. The sensor arrangement as claimed in claim 1, wherein the permanent magnet is fixed to a shaft, wherein the material of the permanent magnet is injection-molded around and/or to the shaft in an injection-molding method.

9. The use of the sensor arrangement as claimed in claim 1, in a motor vehicle control device of a braking system, wherein the motor vehicle control device comprises at least one pedal position sensor.

10. The sensor arrangement as claimed in claim 2, wherein a longer axis of the depression extends along the first pole boundary (N-S) of the magnetization of the permanent magnet.

11. A sensor arrangement for detecting a rotor position of an electric motor of a motor vehicle control device, wherein the sensor arrangement is configured as a contactlessly operating sensor arrangement which comprises at least one permanent magnet and at least one magnetic field sensor, wherein the permanent magnet has at least one depression in at least one top surface facing the magnetic field sensor, wherein the permanent magnet has at least a first pole boundary (N-S) of the magnetization of the permanent magnet, wherein outer side surfaces of the permanent magnet parallel to the first pole boundary have at least one of a straight profile or a concave profile, and wherein further side surfaces of the permanent magnet perpendicular to the first pole boundary have a convex profile.

* * * * *